Nov. 12, 1957   A. RONNING   2,812,953
BRAKE TORQUE REACTORS
Filed June 20, 1952   7 Sheets-Sheet 1
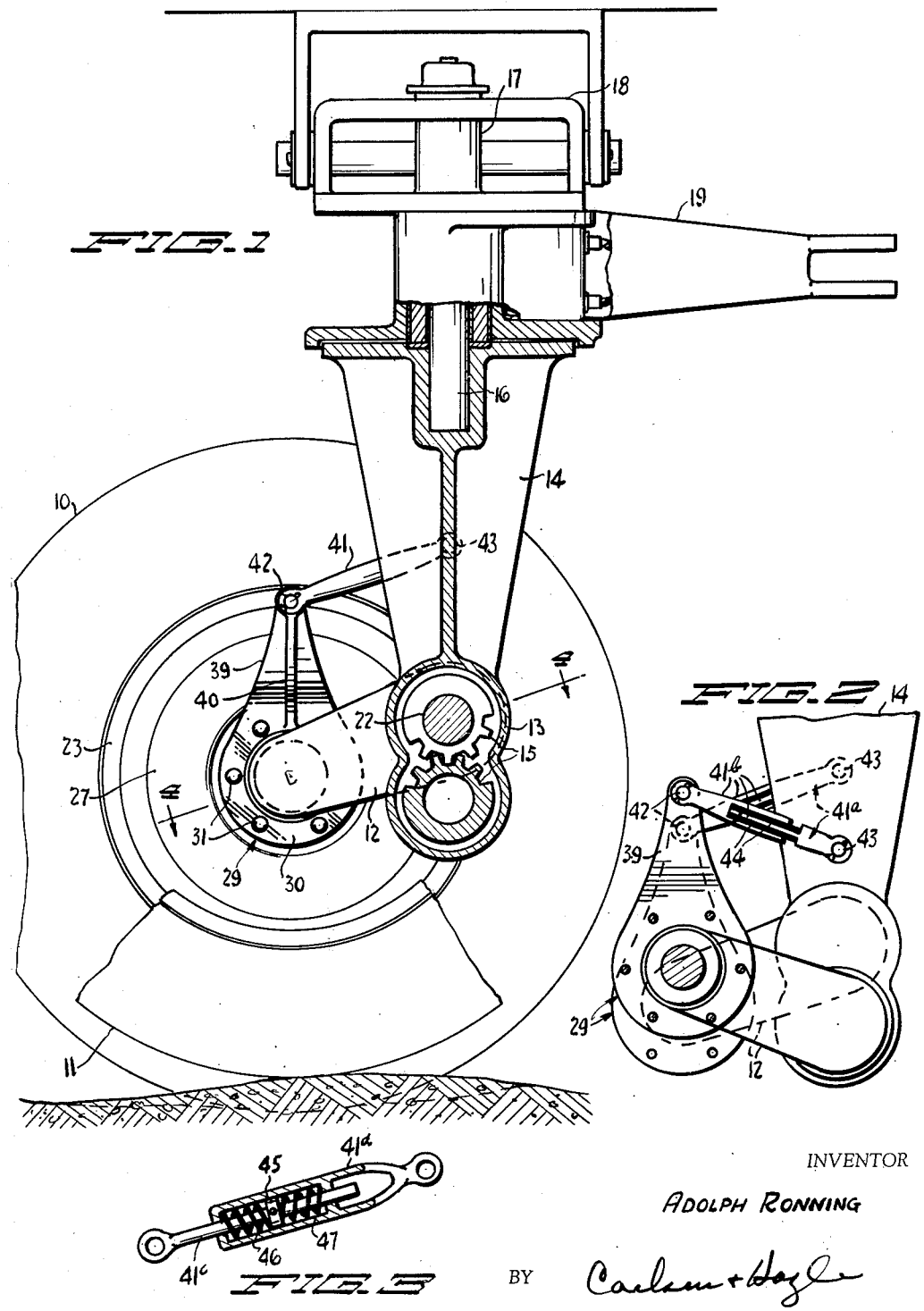
INVENTOR
ADOLPH RONNING
BY Carlsen + Hoyle
ATTORNEYS Nov. 12, 1957  A. RONNING  2,812,953
BRAKE TORQUE REACTORS
Filed June 20, 1952  7 Sheets-Sheet 2

INVENTOR
ADOLPH RONNING
BY Carlsen-Hagle
ATTORNEYS

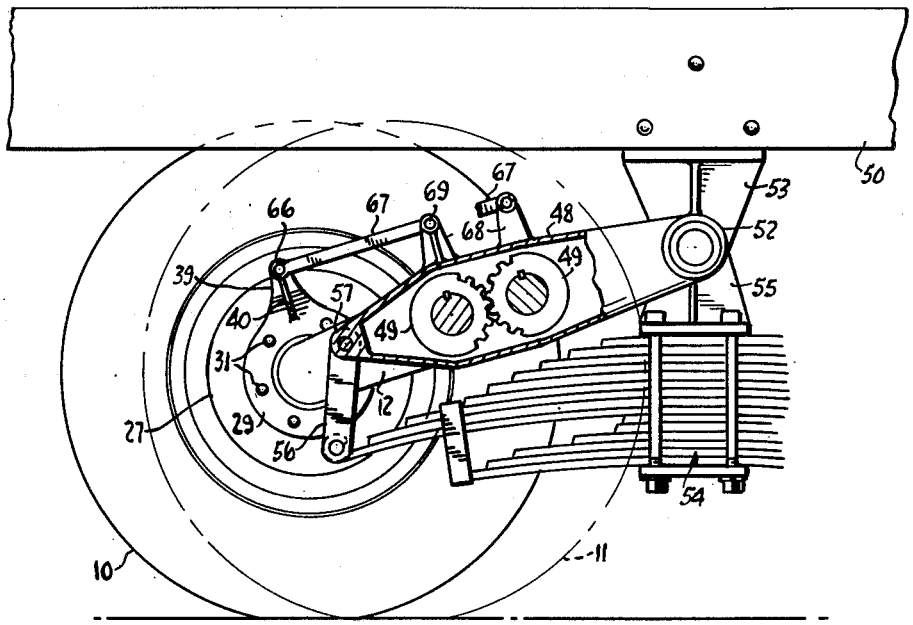
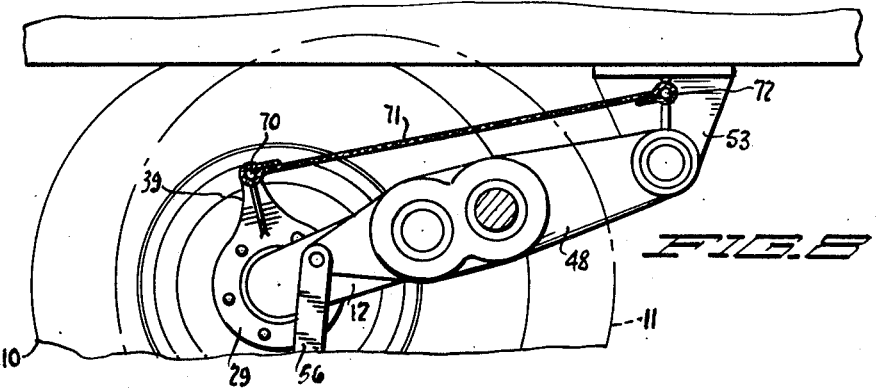
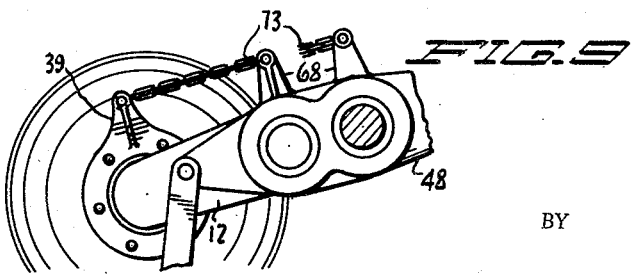

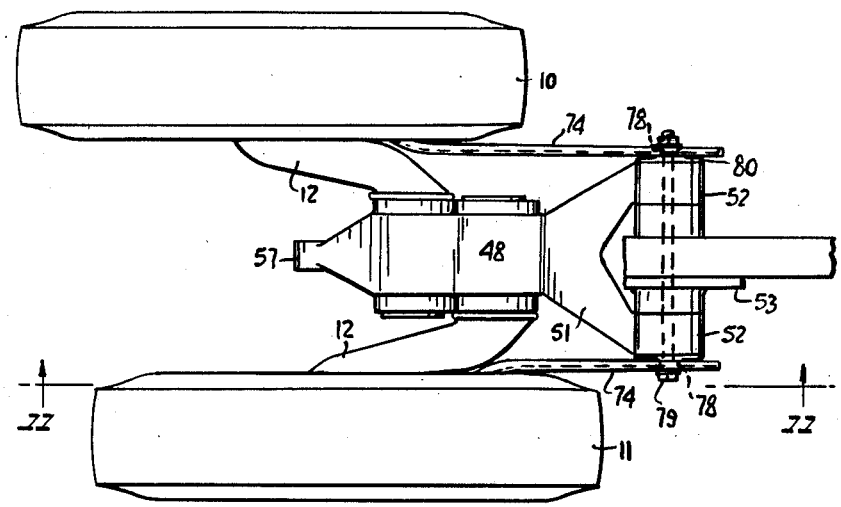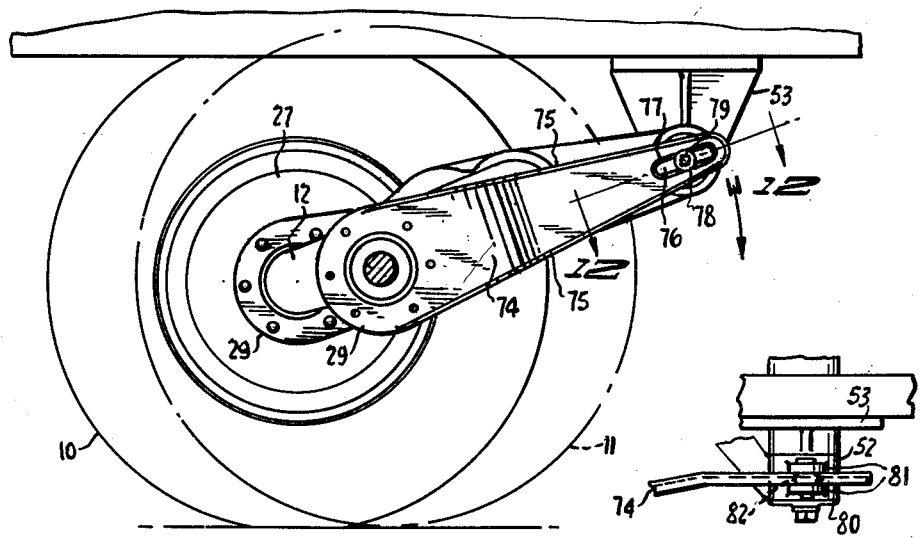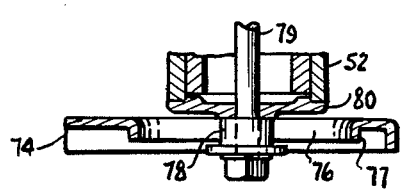

Nov. 12, 1957  A. RONNING  2,812,953
BRAKE TORQUE REACTORS
Filed June 20, 1952  7 Sheets-Sheet 5
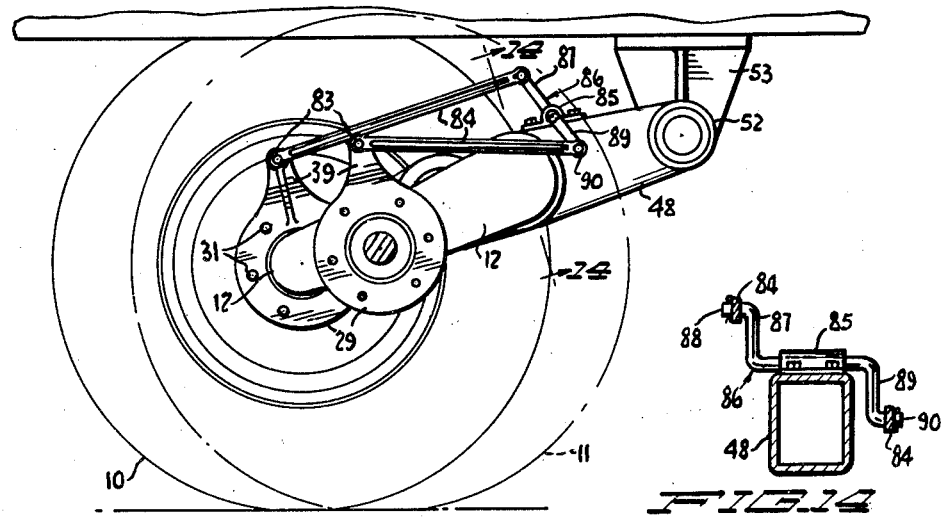
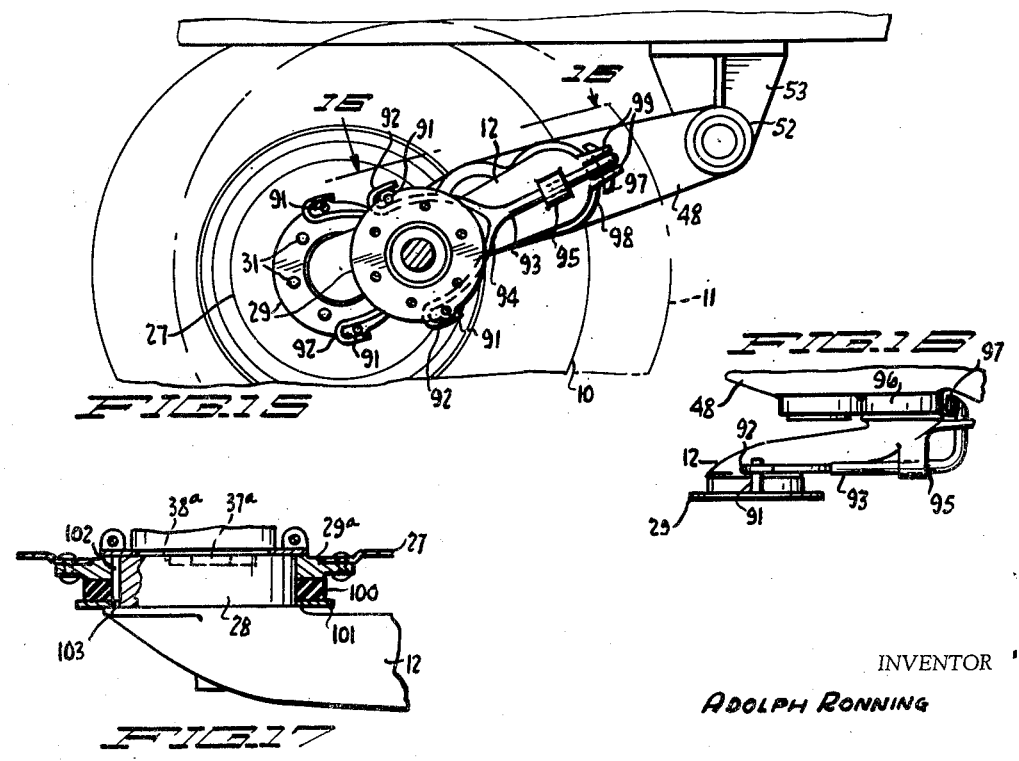
INVENTOR
ADOLPH RONNING
BY Carleen + Hagle
ATTORNEYS

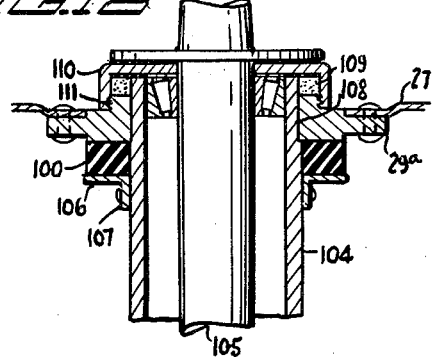
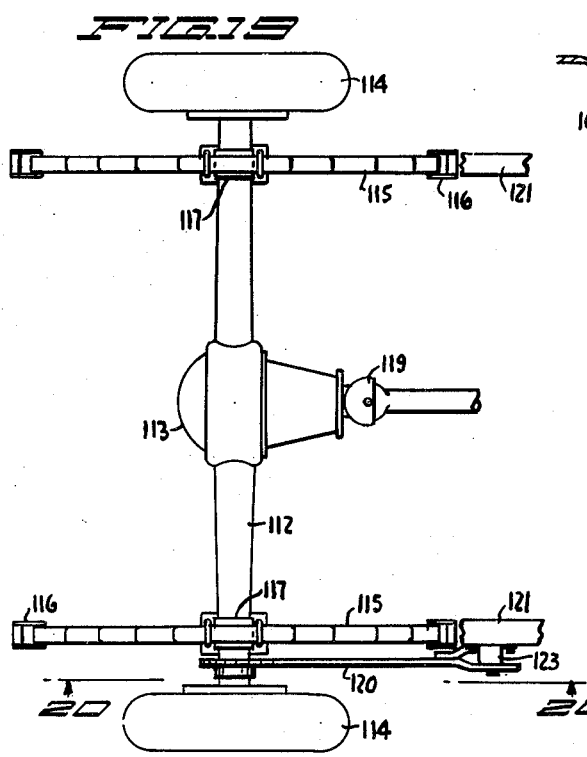
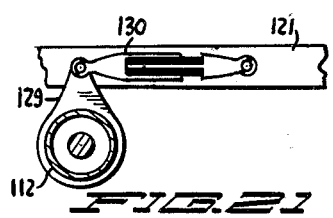
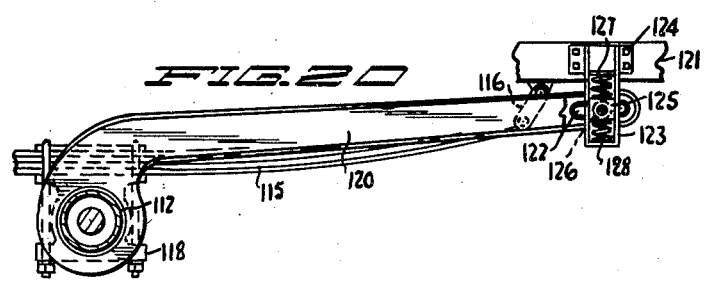
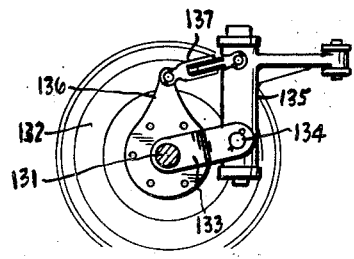
INVENTOR
ADOLPH RONNING

Nov. 12, 1957 A. RONNING 2,812,953
BRAKE TORQUE REACTORS
Filed June 20, 1952 7 Sheets-Sheet 7
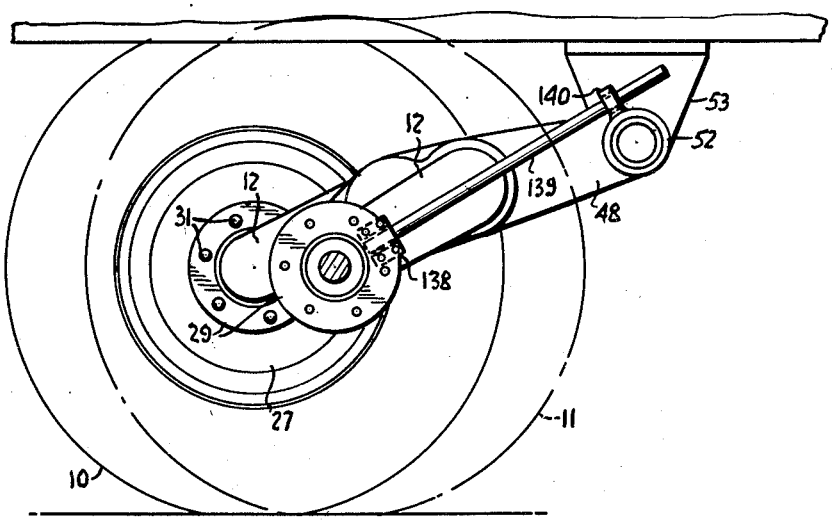
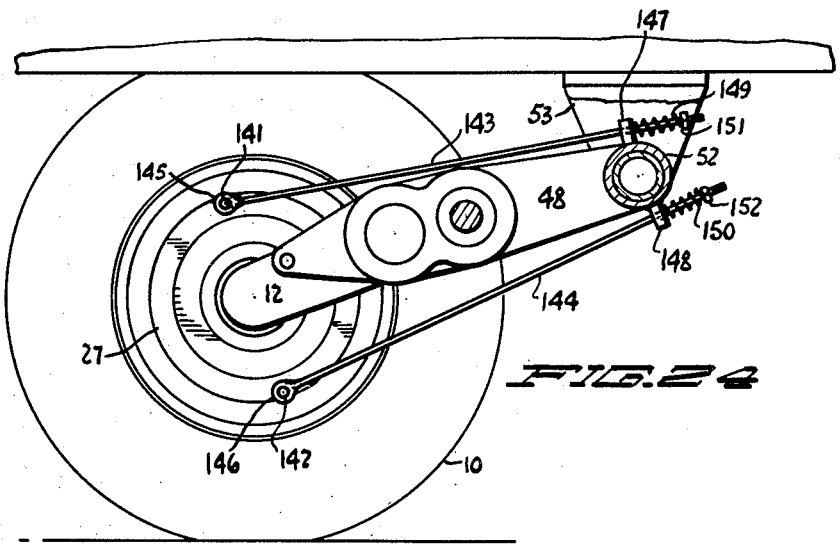
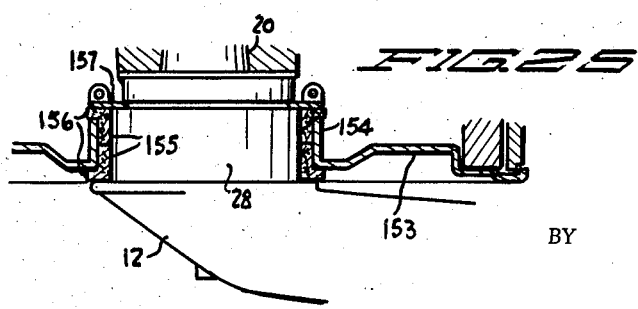
INVENTOR
ADOLPH RONNING
BY
ATTORNEYS

United States Patent Office 2,812,953
Patented Nov. 12, 1957

2,812,953

BRAKE TORQUE REACTORS

Adolph Ronning, Minneapolis, Minn.

Application June 20, 1952, Serial No. 294,605

16 Claims. (Cl. 280—124)

This invention relates to brake torque reactors for the brake-equipped wheels of vehicles, and the primary object is to provide reactor means for association with brake systems in such fashion as to counteract the undesirable effects of brake torque reaction and bring about an increase in the aggregate braking efficiency.

Considering first the common motor vehicle wheel, and brake assembly, there is a journal for the wheel and a stationary axle assembly on which the journal is carried and by which the vehicle load is transmitted to the wheel. The common brake then includes an annular drum carried by and rotating with the wheel and a non-rotating backing plate carried by the stationary axle assembly, on which plate are the brake shoes which are applied to the drum to brake the wheel. There are, of course, many variations of this general arrangement but all include relatively rotating and non-rotating brake parts and my invention is applicable to all. For convenience sake, however, the present disclosure will relate to the common brake assembly as just described. Now when the wheel is braked, by applying the shoes to the drum, there is set up what is called a brake torque reaction, the effect of which is to tend to force the non-rotating parts to rotate with the rotating parts and the wheel. Of course, this force is resisted and the non-rotating parts are not permitted to rotate with the wheel but in extreme cases, where the vehicle is heavily loaded, is traveling at high speed and the brakes are forcibly applied, or in making what is commonly known as a panic stop, damage sometimes occurs and particularly to the fastenings of the springs which yieldably support the vehicle on the axle. In addition to this potential for damage resulting from brake torque reaction, it is believed that it would be desirable to cushion the instantaneous application of the torque to the stationary supporting parts carrying the wheel since braking would then be smoother and less likely to cause any of the known ill results resulting from the present un-cushioned braking of the wheel.

The problems arising from this brake torque reaction are more acute where the wheels are swingably supported for up and down movement as in the case of wheel suspensions of the nature disclosed in my earlier applications to which the present application is related. Attention is first invited to my application Serial No. 601,030 for Vehicle Wheel Compensating Suspension, filed June 22, 1945, and now Patent No. 2,612,387, in which it will be noted that the wheels are arranged in pairs, journaled on the rear ends of cranked axles which are pivoted and differentially connected at their forward ends for interdependent up and down swinging movements about their pivots. The purpose as explained in detail in the application is to differentially compensate the wheels and equalize load distribution under all conditions, with transmission of minimum vertical acceleration to the vehicle itself. In addition, these cranked axles are in turn carried by swingable housing elements pivoted at their forward ends to the vehicle frame, and in the tandem arrangement of the wheel suspension the wheel sets at each side of the vehicle are connected by a walking beam element for what may be referred to as a longitudinal compensating and equalizing action, to impart great flexibility to the suspension and insure the equal load distribution among the considerable number of wheels even under the most aggravated travel conditions. The present invention is also applicable to steerable wheel suspensions of the differentially compensated type and as disclosed, for example, in my prior application Serial No. 26,203 for Steerable Trailer Front Wheel Mechanism, filed May 10, 1948, and now Patent No. 2,650,100. In this steerable suspension the wheels are again carried at the rear ends of cranked axles and these axles are pivoted and differentially connected at their forward ends and are also arranged for dirigible movements about an upright steering or caster axis. It will be noted that in all of these differentially compensating suspensions there is in common the fact that the wheels are journaled on elements which may swing upwardly and downwardly and which trail from forward points of pivotal attachment to the load. Considering now the action of brake torque upon these types of assemblies, it will at once be observed that the brake torque reactive forces are normally effective about the axis of rotation of the wheels and that such forces will have an angular component operating about the pivot axes of the cranked axles. From the outset I have believed that this brake torque reaction may possibly have a tendency to cause these wheels to in effect "kick up" very slightly when the brakes are forcibly applied, particularly when traveling rearwardly, with the result that there may be a small but still undesirable momentary reduction in traction. Just what effect this will have on the aggregate braking efficiency of all of the wheels is even now not entirely clear, but it is believed to be desirable to counteract any tendency of the brake torque reaction to lift the wheels and to apply the brake torque reaction to the vehicle in some fashion which will tend to increase the aggregate braking efficiency. It will, of course, be recognized by those skilled in the art that in heavy duty and high speed, over-the-road vehicles any diminution of braking efficiency, however slight, is something to be avoided at all costs and any increase in aggregate braking efficiency, which may be secured comparatively inexpensively and without adding substantial weight to the vehicle, is something much to be desired.

Since there is subject matter in common, and the present inventive concept finds origin in my previous applications hereinbefore identified, this application constitutes a continuation-in-part of the earlier applications.

Bearing in mind the foregoing aspects of brake torque reaction in both the ordinary type of vehicle and the differentially or swingably mounted wheels of my trailer suspensions, it is the primary object of my invention to provide means, or what I prefer to call reactors, of various generically related forms which may be utilized to cushion the application of the brakes, if this is desired; which will demonstrably reduce the deleterious effect of the torque upon the stationary axle assemblies of motor vehicle wheels; and which will remove the effect of this torque from the axes of rotation of the wheels of my differential wheel suspensions to points removed from such axes and thereby counteract any "kick up" tendency which there may be. Throughout the various forms of the reactors herein disclosed there is in common the fact that I permit limited angular displacement or rotation of what has heretofore been the strictly stationary parts of the brake assemblies, so that the immediate effect of the torque, as the brakes are applied, is to cause these parts of the brake assemblies to instantaneously turn a short distance with the wheels. It is a further and important object of my invention, then, not only to provide for this limited rotation of these brake parts, as the brakes are applied, but to utilize the force and motion thus developed to apply the resultant torque reaction in some fashion to the vehicle to counteract the otherwise undesirable effects of the torque, or alternatively to use this force and motion to distribute the torque reaction between the differentially compensated wheels of my suspension or, as a third generic expedient, to actually use the torque induced motion to apply a braking force, distinct from that of the vehicle brakes themselves, to counteract any tendency of the wheels to "kick up" as previously described.

In the differentially compensated wheel suspensions of my prior applications brake torque reaction may be particularly undesirable in its effects upon the wheels when the vehicle is moving rearwardly, inasmuch as any tendency of these wheels to kick up will be aggravated by the fact that their cranked axles are, as stated supra, pivoted at what is normally their forward ends, as will be readily appreciated. It is accordingly a further object of my present invention to provide brake torque reactors which will completely remove the effects of the torque reaction from the axes of rotation of the wheels to some point on the vehicle which will counteract and eradicate the tendency of the wheels to kick upwardly when the vehicle is traveling in a rearward direction.

Still a further object of my invention is to provide what may be described as a yieldably mounted, quasi-stationary brake assembly so constructed and arranged as to permit an instantaneous, cushioned and, of course, limited travel of this part of the assembly with the wheel as the brakes are applied to therefore cushion the brake application, as is regarded to be desirable. Further in accordance with this object of my invention I provide positive means for limiting the motion of this cushioned and movable part of the brake assembly, as a fail-safe measure which will insure the application of the brakes even should such cushioning means be rendered ineffective in any way.

The foregoing are the more general objects of my invention and further and more specific objects will be made clear in the course of the following specification in the direction of the various generically related forms of reactors herein disclosed, and reference is now invited to the accompanying drawings, wherein—

Fig. 1 is a longitudinal and vertical sectional view through a steerable, differentially compensating vehicle suspension with only the lower portions of the near wheel shown and illustrating one fundamental form of brake torque reactor, according to my invention, embodying a link connection between the brake system and the dirigible pedestal to which the wheels are connected.

Fig. 2 is a detail and side elevation of the lower portion of the assembly of Fig. 1 with both wheels omitted but showing the cranked axle for the near wheel and illustrating one form of link having longitudinal resiliency for cushioning torque reaction.

Fig. 3 is an enlarged and detail view, partially in section, of another form of link usable in the torque reactor of Fig. 1 or in other forms where links are used as the elements for transmitting the reaction from the wheel axis.

Fig. 7 is a vertical and longitudinal sectional view through one of the rear wheel sets of wheel suspension of Serial No. 601,030, with the near wheel shown in dot-dash lines, and illustrating another form of torque reactor.

Fig. 8 is a simplified showing of the upper part only of the suspension of Fig. 7 and showing still another form of one reactor embodying a flexible connection from the brake system to the vehicle.

Fig. 9 is a similar view showing still another type of flexible torque reactor connection.

Fig. 10 is a view similar to Fig. 6 but illustrating another generically related form of torque reactor wherein a lever arm extends from the brake system to the axis about which the wheels swing, in order to apply the downward component of the brake torque reaction to the vehicle.

Fig. 11 is a longitudinal sectional and side elevational view of the reactor of Fig. 10 as taken along the line 11—11.

Fig. 12 is an enlarged sectional and detail view along the line 12—12 of Fig. 11.

Fig. 12A is a detail plan view of another form of lever arm connection usable in the torque reactor of Figs. 10-12.

Fig. 13 is a view similar to Fig. 11 but showing a further form of torque reactor in which the reaction forces are differentially applied between the differentially connected wheels.

Fig. 14 is a sectional detail view along the line 14—14 in Fig. 13.

Fig. 15 is a view similar to Fig. 13 but showing a torque reactor in which the reaction forces are utilized for the application of a braking action tending to prevent upward or downward movement of the cranked axles about their pivots.

Fig. 16 is a fragmentary plan view along the line 16—16 in Fig. 15.

Fig. 17 is a sectional detail view of the central portion of the assembly shown in Fig. 4 but illustrating a cushioning or resilient connection between the axle and the part of the brake system mounted for limited rotation.

Fig. 18 is a diametrical sectional view through an end portion of a conventional vehicle axle assembly, illustrating the application thereto of a cushioned torque reaction element analogous to that shown in Fig. 17, but applied to the stationary axle housing for yieldably and rotatably mounting a part of the brake structure thereon.

Fig. 19 is a plan view of the rear portion of a conventional motor vehicle showing the ordinary axle housing, differential and springs, as well as a portion of the chassis, and illustrating a form of brake torque reactor applicable thereto.

Fig. 20 is an enlarged, fragmentary, longitudinal and vertical sectional view along the line 20—20 in Fig. 19.

Fig. 21 is a similar sectional view through the axle and axle housing but illustrating the application thereto of a cushioning torque reactor link like that of Fig. 2 as an example.

Fig. 22 is a vertical sectional view through the journal of a steerable front wheel for the common motor vehicle and illustrating the application of a brake torque reactor thereto according to my invention.

Fig. 23 is a view similar to Fig. 13 of a differential wheel suspension and showing a brake torque reactor consisting of a spring rod connected between the brake and the vehicle frame.

Fig. 24 is a somewhat similar view but showing a brake torque reactor embodying tension rods for transmitting the torque reactive forces to the vehicle frame.

Fig. 25 is a sectional detail view similar to Fig. 4 but showing a one-piece, pressed backing plate with a center bearing as mounted upon the axle by means of oilless bearing elements.

Figure 4:
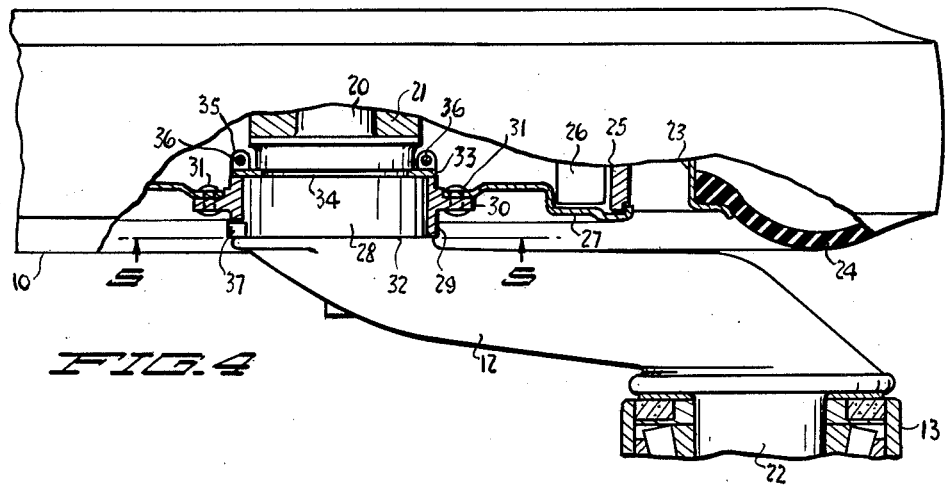
Fig. 4 is an enlarged fragmentary plan and sectional view taken in general along the plane indicated by the line 4—4 in Fig. 1 and illustrating the manner in which the previously stationary part of the brake mechanism is now arranged for limited rotation or oscillation.

Referring now more particularly and by reference characters to the drawing I have shown in Fig. 1 thereof a steerable, differentially compensated wheel suspension of the type disclosed in my prior application Serial No. 26,203, now Patent No. 2,650,100, and this suspension includes a pair of closely spaced wheels 10 and 11, each of which is journaled at the rear end of a cranked axle 12 extending forwardly between the wheels. There is, of course, a pair of such axles 12 and at the forward ends the axles are journaled on transverse axes and in vertically spaced relation in a housing 13 formed at the lower end of a pedestal 14. Within said housing 13 these cranked axles are connected by meshing gears 15 so that as either axle moves upwardly, while its wheel rolls over an obstruction upon the travel surface, the other axle and associated wheel will be moved downward an equal amount by the interaction of these gears. Thus it will be seen that the wheels have a differential compensation which will continuously equalize load distribution to the wheels and will permit travel over irregular road surfaces with a minimum vertical deflection of the associated vehicle. As here shown the wheel suspension is steerable, or casterable, and for this purpose the upper end of the pedestal 14 swivels about an upright king pin 16 held in a bearing assembly 17 carried by a transversely extending bolster 18. A forwardly turned steering arm 19 is selectively connectible to steer the wheels 10 and 11 by mechanism not pertinent to the present disclosure but described in detail in the application in question.

Figure 5:
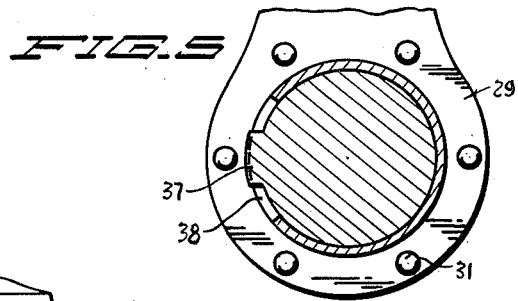
Fig. 5 is a section along the line 5—5 in Fig. 4 illustrating the bearing structure for the brake mechanism and one manner in which fail-safe operation may be provided and the rotation of this part of the brake mechanism positively limited under all circumstances.

At this point attention is called to Figs. 4 and 5 wherein one of the cranked axles 12 is shown in larger scale and in more detail. For journaling the associated wheel 10 the rear end of the axle 12 is shown as provided with a laterally extending journal 20 on which the wheel structure is rotatably mounted, as indicated at 21, and the forward end of the axle in turn is provided with a trunnion 22 by which it is journaled into the aforesaid housing 13. Forming part of the structure of the wheel 10 is, of course, the wheel rim 23 for mounting the pneumatic tire 24 and internally of the rim the rotating part of the brake assembly includes an annular drum, shown fragmentarily at 25. In the ordinary case the brake assembly further includes one or more brake shoes, such as indicated rather schematically at 26 which are carried by a stationary, circular backing plate 27 and with, of course, any suitable actuating means (not shown) for applying these shoes to the drum 25 in order to brake the wheel. It is a fundamental concept of my invention, however, to so mount this backing plate 27 that it is permitted limited angular displacement or rotation with the wheel 10 when the brakes are applied, the plate remaining stationary, of course, when there is no braking contact with the drum 25.

As one example of a practical mounting arrangement for the backing plate 27 under these circumstances, I here show the rearward portion of the cranked axle 12 as formed with a circular bearing or bearing surface 28 for rotatably receiving a bearing collar 29 and this collar is then provided with a peripherally projecting flange 30 to which the backing plate is riveted at intervals, as designated at 31. Axial displacement of the collar 29 and associated backing plate along the axis of rotation of the wheel is prevented by the running engagement of the collar with an annular shoulder 32 at the one edge and similar engagement with a retaining band 33 at the opposite edge. This band 33 may be made up in two identical semi-circular sections so that they may be assembled and fitted at their inner edges into a peripheral groove 34, adjacent the bearing surface 28, to provide a positive lock against movement of the collar. In order, then, to hold these two sections of the band in place I contemplate turning up apertured ears 35 from the facing ends of each section and clamping these ears together by means of bolts, as designated at 36. For a purpose presently to appear I also illustrate in these two drawings the formation of a radially projecting stop lug upon the bearing surface 28 and located in a notch 38 formed in the bearing collar 29, so that the relative angular movement between the collar and bearing surface is positively limited.

It will now be understood that immediately as the brake shoes are applied to the brake drum 25 the resulting brake torque reaction upon the backing plate 27 will tend to cause the same to rotate upon the bearing 28 until the stop lug 37 engages an end of the notch 38. There thus results a force and motion upon the backing plate directly reflecting the brake torque reaction, and I propose to utilize such factors in controlling or dissipating the effects of the torque reaction.

Returning now to Fig. 1, I show the bearing collar 29 as formed with a radially extending torque reactor arm 39, which may be an integral extension of the flange 30, with a suitable stiffening rib 40 as clearly shown. Quite likely this arm 39 will require a double bend, as indicated by the shading in this view, in order to bring its outer extremity to a point clearing the inner surfaces of the wheel. As here shown the arm 39 furthermore is extended upwardly although, of course, I do not limit myself to this direction or to any particular angle of the arm, since under various circumstances it will be possible to take off the torque reaction in many different directions. As here shown, however, the effect of applying the brakes, with the wheel traveling in a counterclockwise direction for rearward travel of the associated vehicle, will be to cause the upper end of the arm 39 to travel in an arc rearwardly or away from the pedestal 14. In accordance with my invention, then, such motion of the arm 39, as a result of the brake torque reaction, is prevented by the provision of a torque reactor link 41 pivotally connected at its rear end 42 to the upper end of the arm and similarly pivoted at 43 at its forward end to the pedestal 14 above the pivot for the axle 12. Now it will be apparent that the effect of the brake torque reaction, and the force exerted thereby, instead of operating about the axis of rotation of the wheel will be brought out in the form of a leverage upon the arm 39 and a tensioning action upon the link 41. What occurs is the translation of the brake torque reaction from the axis of rotation of the wheel through the arm 39 and through the link 41 to the pivot point 43 upon the pedestal 14, which in effect amounts to transmitting the reactive forces to the vehicle itself. Thus any tendency of this brake torque reaction to cause the cranked axle 12 to swing about its forward pivot mounting will be completely eliminated, since the reactive forces are not now operative about the forward pivot of the axle, but are instead transmitted to a point remote from that pivot and directly to the vehicle itself. It is to be noted also that the pivots 42 and 43 for the link 41 are equally spaced relative to the axis of rotation of the wheel and the pivot axis of the axle 12, so that the link and axle have what may be called a parallel motion and the link will in no way interfere with the normal, up and down and compensating motions of the axle.

It will, of course, be understood that the wheel 11 will also be similarly equipped, as is indicated in Fig. 2, and that its link pivots will be correspondingly arranged to provide this desirable parallel motion. Since in the structure here shown the front end pivots for the axles are vertically spaced there will be a corresponding and equal vertical spacing on the front end pivots for the rims 41.

While the operation has thus far been described in connection with the braking of the wheels during rearward motion of the vehicle, it will be readily observed that the same beneficial effects will be present where the vehicle is traveling forwardly and where these effects may be also desirable if there is a tendency for the wheels to "kick up" when the brakes are applied. In actual practice this tendency for the wheels to kick up may be slight, or even nonexistent, and when traveling rearwardly may also be quite small for the reason that such movement is generally at comparatively low speeds, but in any event the torque reactor as here shown will transmit the reactive forces to the links 41, to the pedestal 14 and thence to the frame, so that there can be no disruptive effect of these forces upon the wheels.

When braking during forward travel the torque reactor links 41 are subject to compression and are under tension when travel is rearward as previously described and it may be desirable to permit restricted and yieldably resisted variation in the effective length of the links to cushion the application of the brakes. This cushioning may also be operative uni-directionally to permit yieldably resisted elongation of the links when braking during rearward travel, but it will be perceived that the links may be so constructed as to permit such cushioning either uni-directionally or bi-directionally as may be desired. In Fig. 2, as an example, I have shown links, designated at 41a, with the aforesaid pivot connections 42 and 43 between the arms 39 and pedestal 14, but in this case the links are each made of interdigitating sections 41b and rubber is bonded to and connects these sections, as seen at 44. Thus limited and yieldable or resilient compression and elongation of the links are possible, in order to obtain an instantaneous cushioning effect of the motion of the reactor arms 39, resulting from the brake torque reactive forces.

Such cushioning is also possible by the use of springs in the links 41, as shown in Fig. 3, wherein the link is shown as made up of telescopically related sections 41d and 41c. In this construction the link section 41c is provided with a collar 45 and expansion coil springs 46 and 47 are braced against the opposite sides of the collar and react against the other section of the link 41d to permit either compression or extension of the effective length of the link. Obviously where uni-directional cushioning is desired either of the springs 46 and 47 may be omitted, or bi-directional but unbalanced cushioning may be attained by varying the force of the springs used, if such is desired.

Figure 6:
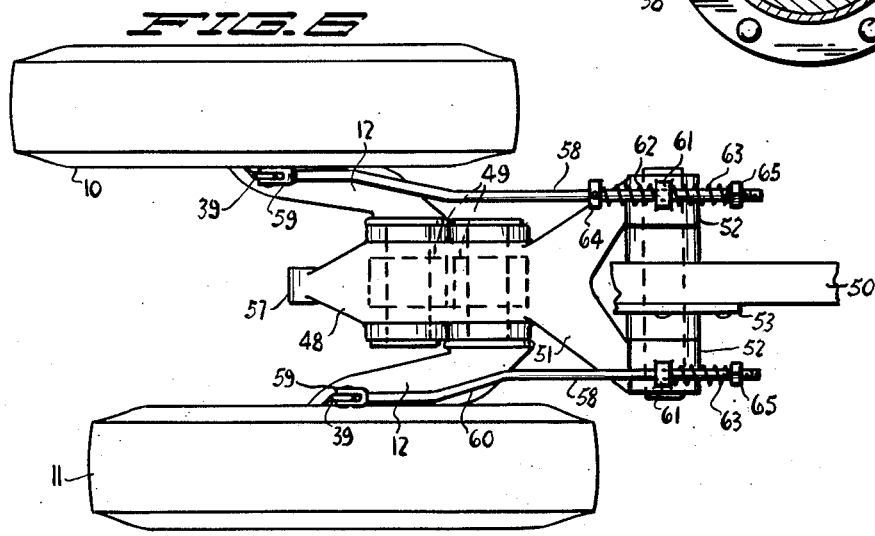
Fig. 6 is a plan view of one wheel set of a non-steerable wheel suspension illustrating only a fragment of the vehicle frame and showing links for transmitting the torque reaction to a point remote from the axes of rotation of the wheels.

In Fig. 6 I shown one of the four wheel pairs making up the differentially compensating and equalizing trailer suspension of my prior application Serial No. 601,030 and here again the basic differential arrangement of the wheels is identical to that disclosed in Fig. 1, so that corresponding numerals are used for designation of the wheels 10 and 11 and their associated cranked axles 12. In this case, however, the forward ends of the axles 12 are journaled in forwardly and rearwardly spaced positions in the rear portion of a housing member 48 within which the trunnions of said axles are differentially connected by meshing gears 49. Thus the same differential compensation of the wheels 10 and 11 occurs but one wheel is offset forwardly of the other by the distance necessary to accommodate the differentiating gears 49. In this type of suspension the housing member 48 angles forwardly and upwardly beneath the associated frame 50 of the vehicle and at its forward end the housing is bifurcated, as seen at 51, and provided with widespread bearings 52. These bearings are pivotally carried on a bracket 53 secured to the frame 50 and thus the wheels 10 and 11 not only may swing about the pivots of the axles 12 but the wheels and the entire assembly may swing about the pivot axis of the bearings 52. The latter swinging motion is spring biased and in the preferred arrangement disclosed in the prior application similar wheel sets to the number of four are arranged with two in tandem at each side of the vehicle, with these tandem wheel sets connected by a walking beam element for a longitudinal compensating action of the wheel sets. A portion of this walking beam element appears in Fig. 7 and the same comprises an elongated leaf spring 54 rockably mounted at its center by a bracket 55 upon the bearing bracket 53 of the rearmost wheel set, with the opposite front and rear ends of the spring linked, as shown at 56, to the rear ends 57 of the housings 48. The beneficial effects of this compensating wheel suspension are set out in detail in the application in question and no further description should be necessary herein. It may be noted, however, that any tendency of the wheels to kick up, as a result of brake torque reaction, may quite possibly be accentuated in this suspension since not only are the cranked axles 12 swingable about forward pivot connections but the entire wheel sets are swingable about the forward pivot bearings 52 of the housing members 48.

Returning now to Fig. 6 I show therein the upper ends of the upwardly turned torque reactor arms 39 which are exactly of the construction previously described. As another alternative form of torque reactor I then show link rods 58 pivoted at their forked rear ends 59 to these arms 39 and extending therefrom forwardly between the wheels and upwardly to overlie the bearings 52. The torque reactor link rods 58 will, of course, angle upwardly in this arrangement and they may be bent inwardly at 60 as necessary to properly bring their forward ends across the bearings 52. These bearings 52 are then provided on their upper surfaces with apertured lugs 61 which are slidably and rather loosely penetrated by the forward portions of the link rods and as seen in the upper part of this particular view expansion coil springs 62 and 63 are placed upon the rod and braced against opposite forward and rearward surfaces of the lugs 61. An adjustable stop collar 64 is provided upon the rod as a bearing for the rear spring 62, while the forward spring 63 bears against a nut 65 screwed upon the forward extremity of the rod, both of these elements, of course, being adjustable for varying the effective effort of the springs. Now it will be apparent that when the wheel 10 is braked during forward travel the resulting forward swing of the arm 39, due to brake torque reaction, will be resisted by the compression of the spring 62 in order to cushion the initial shock, following which the torque reactive forces will be transmitted through the link rod 58 to the lugs 61 and thence to the frame to prevent any tendency to kick the lower wheel in an upward direction.

As the wheel is braked upon rearward travel the resulting movement will, of course, be the opposite to that just described bringing about compression of the spring 63 with initial cushioning and then absorption of the torque reactive forces for the same purpose. As illustrated in the lower part of this view either one of the springs 62 or 63 may be dispensed with where torque absorption or brake cushioning is not desired and in such case the associated torque reactor arm 39 will move freely until the motion is halted by the stop lug 37. Obviously this stop lug 37, due to its limited play in the notch 38, constitutes a fail-safe feature which will insure the application of the brakes should any damage of any of the retarding forces, such as the various links and springs, occur.

In Fig. 7 I show a differentially compensating or equalizing wheel suspension like that of Fig. 6 and with corresponding parts indicated throughout by the same reference characters. In this case, however, the torque reactor arm 39, extending from the bearing collar 29, is pivotally connected at 66 to a torque reactor link 67 extending forwardly above the housing member 48. This member is then provided with an upstanding bracket 68 to which the forward end of the link 67 is pivoted at 69. There will, of course, be a similar structure for the wheel 11 shown only in dotted lines in this view and only a fragment of the link 67 appears. It will, of course, be readily understood that this arrangement of the link 67 will transmit the brake torque reaction to the housing member 48 and thence to the vehicle frame, a part of which appears at 50, in a manner such as to counteract the tendency of the wheels to lose traction when the brakes are applied in exactly the manner previously described.

It will, of course, be understood that either of the cushioning types of links shown in Figs. 2 and 3 may be utilized instead of the link 67 just described in order to obtain a cushioning effect upon brake application, and this is true throughout the various embodiments of my invention wherever analogous links are employed for transmission of the reactive forces.

In Fig. 8 a similar wheel suspension is again indicated throughout by corresponding reference numerals and here the torque reactor arm 39 of the bearing collar 29 is connected at 70 to a flexible cable 71. This cable may extend forwardly to any suitable point upon the housing member 48, or other part of the frame structure, and is here shown as connected at 72 to the bracket 53 above the pivot for the housing member. With the cable thus arranged there will, of course, be no transmission of torque reaction forces to the frame during forward travel because of the flexibility of the cable, but since the cable is non-extensible it will transmit these forces to the frame when the wheels are braked during rearward travel, thus to accomplish my desired results. It may conceivably be possible to employ elastic material for this cable 71 to obtain a cushioning effect upon application of the brakes and such is considered within the scope of my invention.

In Fig. 9 I illustrate fragmentarily an arrangement similar to that of Fig. 7 wherein the housing member 48 is provided with brackets 68 for connection to the torque reactor arms 39. In this case, however, I connect the arms and brackets by means of chains 73, or any other suitable flexible connections, so that the reactor is effective only during rearward travel, as in Fig. 8.

In Figs. 10 through 12 I illustrate what I now regard as a very practical torque reactor for use in connection with my differentially compensating suspension and in this case the bearing collars 29, by which the backing plates are mounted for limited rotation, are formed with forward extensions suitably shaped and arranged to bring their forward ends out to the opposite ends of the pivot mounting for the suspension. Such extensions, which are designated at 74 and which act themselves as brake torque reactor arms, may be formed integrally with the bearing collars 29 or, of course, secured thereto in any fashion, but they are here shown as pressed from sheet metal suitably ribbed at 75 for necessary stiffness. The arms 74 necessarily angle upwardly in this arrangement and where they cross the ends of the pivot mounting their forward ends are formed with elongated slots 76 with the metal around the margins of the slots flanged out, as designated at 77. Rollers 78 are then attached to the pivot mounting and play in the slots 76 so that the necessary swinging motion of the arm 74, during the equalizing action of the suspension, may take place without interference. The flanging at 77 of the slots 76 provides a wide bearing contact with the rollers 78 to accommodate this motion and I have shown these rollers 78 as mounted for rotation at the ends of a long bolt 79 which traverses the pivot mounting and holds the same in assembly, as indicated in Fig. 12. The ends of the pivot mounting are provided with caps 80 which are retained by the bolt 79 and which form a bearing for the rollers 78.

Now as the brakes are applied to the wheels the torque reactive forces will tend to swing the arms 74 about the axes of rotation of the wheels, but such motion is prohibited by the pivot mountings of the forward ends of the arms so that the forces are transmitted to the frame and can have no effect whatsoever upon the wheels. As an example I have indicated in Fig. 11 an arrow showing the direction in which the arm 74 will tend to move when the brakes are applied during forward travel and it will be observed that this force is exerted in a downward direction and will therefore tend to "crowd" the vehicle down toward the road surface.

Fig. 12A illustrates in plan a forward end of one of the brake torque reactor arms 74 as arranged to pass above the adjacent bearing 52 for pivoting the wheel suspension and this bearing is then provided with spaced, apertured lugs 81 between which the arm loosely passes and between which there is also mounted a roller 82 for engaging the slot in the arm. Obviously this arrangement will operate in the same fashion as that shown in Figs. 10–12 and is an alternative connection for the arm, which may be desirable where the pivot arrangement for the suspension itself is of a different construction.

Figs. 13 and 14 illustrate a differentially operating braking torque reactor for the wheel suspension of my application Serial No. 601,030 and here again elements of this suspension previously described are indicated throughout by corresponding reference numerals. In this case the backing plates for the brakes are again arranged for limited rotation by means of the bearing collars 29 which are provided with radially extending reactor arms 39. The extremities of these arms are then pivoted at 83 to links 84 extending forwardly to opposite sides of the housing member 48 and pivotally mounted across the upper part of this housing member, in a suitable bearing bracket 85, is a reversely bent double crank element 86. At one side of the housing member this crank element has an upwardly extending crank member 87 with a horizontally turned end 88, while at the opposite side of the housing there is a downwardly turned crank 89 with a corresponding, horizontally turned end 90. As clearly shown the forward ends of the links 84 are then pivotally mounted upon these ends of the cranks and because the cranks are turned in opposite directions, or at 180 degrees, the motion of the arms 39 by the brake torque reaction will be differentially or compensatingly transmitted through the crank from one brake system to the other. In effect what will take place then amounts to a cancellation of the torque reactive forces so that the wheels 10 and 11 will retain equal traction and braking power under any and all circumstances. It will be noted that this differential distribution of the brake torque reactive forces acts in conjunction with the equalizing motions of the cranked axles 12 and assuming, as an example, that the wheel 11 when braked attempts to kick upward so that it loses traction it will be observed that such motion will be accompanied by a downward motion of the other wheel 10 by the differentiation through the axles 12. Ordinarily, then, the wheel 10 under these circumstances would have a greater braking effect than the wheel 11, but this action will be accompanied by the transmission of the brake torque reaction through the links 84 and crank element 86 to equalize the braking effect of both wheels and this mechanism will thus not only equalize load distribution between the wheels but also the braking effect thereof.

Since it is my intention, as one fundamental concept of the present invention, to utilize the slight travel of the "stationary" part (i. e., backing plates and shoes) of the brake mechanism with the wheels as the brakes are applied, to take care of brake torque reaction and prevent any tendency of the differentially mounted wheels to lose traction, it will be apparent that this effect may be achieved by actually applying a braking force which will resist both upward and downward motion of the wheels. One such arrangement is illustrated in Figs. 15 and 16 wherein the collars 29 are shown as provided with diametrically opposed studs 91 which have limited freedom of movement in the looped rear ends 92 of brake rods 93. Such brake rods, which are forked at their rear ends 94 to bring the loops 92 out to proper position with reference to the studs 91, are slidably mounted through apertured lugs 95 formed upon the forward ends of the cranked axles 12. Forwardly of such lugs 95 the rods 93 turn inwardly, forward of annular bearing projections 96 which form part of the housing members 48, and at such ends the brake rods are formed with, or provided with, brake shoes 97 having arcuate surfaces adjacent such projections 96. Assuming the wheel 11 to be braked when traveling in a rearward direction the resulting counterclockwise motion of its associated bearing collar 29, as viewed in Fig. 15, will cause the uppermost stud 91 to travel to and engage the closed end of the upper loop 92 of the brake rod and will pull such rod bodily rearward through the bearing lug 95. As a result of this motion the brake shoe 97 will be forcibly applied to the forward brake surface 98 of the housing projection 96 and since this surface is stationary with reference to the cranked axle 12 any tendency for the axle and its associated wheel to swing upward will be frictionally braked and retarded. The same operation will, of course, occur when the wheels are braked during forward travel, in which case it will be the lowermost studs 91 which engage and pull the brake rods 93 in the rearward direction and it will, of course, be readily understood that now the open ends of the loops 92 will clear the uppermost studs 91 and that the brake thus operates in both directions with equal facility. If it is desired to brake the axles only during one direction of movement of the vehicle the identical brake structures here shown may be employed and one of the studs 91 omitted from the collars 29, as may be desired. In order to resist deflection of the ends of the brake rods 93 as the brake shoes 97 are applied, the cranked axles 12 are here shown as provided with forwardly extending stop or guide fingers 99 for bracing the brake rod immediately adjacent the brake shoes and forming a confined guideway therefor.

In Fig. 17 I have shown a bearing arrangement for the backing plate bearing collar similar in general to that shown in Figs. 4 and 5, but in this case the collar, here designated at 29a, is bonded to a rubber or resilient collar 100 which is in turn bonded to a disk 101 secured upon the bearing 28 of the axle. In order to anchor the plate 101 against rotation I have, as an example, illustrated the bearing 28 as provided with a keyway 102 and the plate with a key 103 entering said keyway. The rubber collar 100 will now permit limited and resiliently cushioned rotation of the bearing collar 29a so that as the brakes are applied there will be an instantaneous cushioning effect much to be desired. This bonded rubber mounting may be utilized throughout all of the various forms of my reactors herein disclosed where the cushioning effect is not otherwise provided by the links or other connections, and such cushioning arrangement also has applications to other types of wheel mountings, as will next be described. Also in Fig 17 I have shown in dotted lines a fail-safe stop lug 37a and cooperating notch 38a in an obvious but somewhat different arrangement from that shown in Figs. 4 and 5.

In Fig. 18 I have illustrated a brake torque reaction cushioner similar to that of Fig. 17 but applied to the stationary axle housing 104 of a conventional motor vehicle wheel assembly, for example one of the driven rear wheels thereof. In such assemblies there is a live or driven axle 105 journaled through the housing 104, to which live axle the wheel is secured and for mounting the brake shoe backing plate 27 of the brake mechanism there is again provided a bearing collar 29a essentially identical to that shown in Fig. 17. This collar is bonded to a rubber ring 100 which is in turn bonded to an annular mounting member, indicated at 106 and shown as secured at 107 to the housing 104. The collar 29a is rotatably mounted upon a bearing surface 108 formed at the extremity of the housing 104 and I have shown an oil seal 109 held in place by a cap 110 screw threaded at 111 onto the collar as one convenient way of closing the end of the housing. This arrangement constitutes a simple way in which to secure the benefits of the cushioned absorption of brake torque reaction in any type of vehicle and will require but a minimum of alteration thereof, as will be readily appreciated.

Figs. 19 and 20 illustrate still another brake torque reactor useful upon the common type of motor vehicle for cushioning the torque reactive effects and is here shown in association with the conventional rear axle housing 112, within which are axle shafts (not shown) driven through the differential 113 for transmitting torque to the wheels 114. The axle housing 112 is carried by elongated leaf springs 115 in the customary manner, and as explained hereinbefore brake torque reaction sometimes causes damage to these springs and particularly to their end fastening shackles 116 when sudden stops are made at high speeds. The brake torque reaction under these circumstances is effective directly upon the axle housing 112 which is presently rigidly secured to the centers of the springs 115, so that the forces also act directly upon the springs themselves. In accordance with my invention I provide the axle housing 112 with bearings 117 by which the center spring clamps 118 for the springs 115 are rotatably connected to the housings, instead of rigidly or non-rotatably mounted thereon as is customary. Such connection frees the housing 112 for rotation with the wheels 114 when the brakes are applied, and to provide for such rotation the drive to the differential 113 is made through a universal joint 119 which will permit swinging movements of these drive elements of considerable amplitude. I then secured to the axle housing 112 an elongated torque reactor arm 120, which extends forwardly from the housing alongside any convenient portion 121 of the vehicle frame. By then making a connection between the forward end of the arm 120 and the frame 121 the turning motion of the axle housing 112, under the influences of brake torque reaction, may be limited and the forces arising from such reaction transmitted directly to the vehicle frame without ill effects upon the springs and their connections, as will be understood.

It will be obvious that many of the cushioning elements and links of the earlier modifications of the invention may be utilized in this case, but I have herein shown the forward end of the arm 120 as formed with an elongated slot 122 and the arm is thus closely analogous to that shown in Fig. 11. Preferably the forward end of the arm 120 is bifurcated to straddle an upright guide 123 secured at 124 to the frame 121 and vertically reciprocatable in this guide is a block 125 carrying a roller 126 playing in the slot 122. Expansion coil springs 127 and 128 bias the block 125 in what may be described as a normal position and yieldably resist the swinging motion of the forward end of the reactor arm 120 which occurs as the brake torque reaction is transmitted therethrough. Thus while the reactive forces are dissipated in the frame of the vehicle the springs cushion the action to secure also the benefits of the cushioning effect upon the brake application.

As suggestive of the modifications to which this type of torque reactor is subject, I have illustrated in Fig. 21 a torque reactor arm 129 as secured to and extending upwardly from the axle housing 112 and then connected through a link 130, identical to that of Fig. 2, to an adjacent portion of the frame 121. The operation of this one reactor will be obvious and it will also be apparent that it will lend itself to convenient arrangement in connection with the axle and frame, however they may be constructed and arranged.

Similar means may be used for the dirigible front wheels of the common motor vehicle and as one convenient expedient therefor I have shown in Fig. 22 the journal 131 for the usual front wheel 132 upon an arm 133 pivoted at 134 upon the conventional steering knuckle 135. Limited rotation of the stationary portions of the brake system is permitted again and a torque reactor arm 136 is then secured to said portions and connected through a link 137, like that of Fig. 2, to the steering knuckle 135 so that the torque reaction will be absorbed with a cushioning effect and transmitted to the frame of the vehicle through said knuckle and associated parts. As also clearly shown the link 137 is arranged to operate as a parallel motion linkage in conjuction with the arm 133 which carries the wheel.

Referring now to Fig. 23 I again illustrate therein a differentially compensating wheel suspension like that of my application Serial No. 601,030 and indicate the corresponding parts thereof by the reference numerals previously used. Here again the bearing collars 29, which are arranged for limited turning motion with the wheels under the influence of brake torque reaction, are used and they are provided with suitable clamps 138 for rigidly securing in place torque reactor rods, one of which appears at 139. Such rods are made of spring material and extend rigidly and radially from the axes of rotation of the wheels 10 and 11, upwardly and forwardly to overlie the bearings 52 of the housing member 48. These bearings are then provided with apertured lugs 140 through which the forward ends of the rods 139 are slidably and rather loosely mounted, as clearly shown. The nature of the rods 139 is such that they resist bending in any direction and thus as the collars 29 are moved by the brake torque reaction the rods of necessity are flexed, or bowed, with the result that the brake torque reaction is again transmitted to the frame with a cushioning action provided by the rods themselves. Obviously the lugs 140 may be located on other parts of the assembly and the showing here made is suggestive only.

In Fig. 24 I again show the differential compensating suspension but in this case the rotatably mounted backing plate 29 for the brakes is provided at diametrically opposed points with projecting studs 141 and 142. This arrangement is analogous to that shown in Fig. 15 but the studs 141 are here shown as located nearer the perimeter of the backing plate for maximum leverage and maximum travel. Torque rods 143 and 144 are pivotally connected at 145 and 146 to the studs from which they angle upwardly and forwardly above and below the bearings 52 of the housing member 48. Each bearing is then provided with oppositely projecting apertured lugs 147 and 148 through which these rods 143—144 slidably and loosely project, and forwardly of the lugs the rods are fitted with expansion coil springs 149 and 150 adjustably held in place by nuts 151 and 152. It will be obvious that these rods 143 and 144 will be moved in opposite directions axially through the lugs 147—148 by the movement of the backing plate as the brakes are applied and that, depending upon the direction of rotation of the wheels, one rod will be moved rearwardly, compressing its associated spring 149 or 150. Thus the torque reaction will again be brought directly to the frame and will be cushioned by the springs, but this reactor is advantageous in that the rods 143 and 144 operate under tension, when transmitting the torque reaction, so that they may be very light and comparatively small in diameter.

I have heretofore described the brake backing plate as connected to a center bearing collar to permit its rotation, but it is very practical to form up the backing plate in one piece from sheet material, as shown in Fig. 25 wherein the plate is designated at 153. The plate is formed with a unitary center hub 154 by which it may be journaled upon the bearing 28, previously described, and this structure will obviously be not only very light in weight but inexpensive to manufacture. An oilless bearing may be provided for the hub 154 by the provision of oil impregnated wood bushings or bearing sections 155 running between the hub and bearing 28 and, of course, other types of oil impregnated materials may be used if desired. Axial displacement is then prevented by formation of the bearing sections 155 with opposed peripheral flanges 156 and I here again show the use of the sectional retainer ring 157, like that of Fig. 4, for holding the entire bearing assembly in place, although this structure may thus be varied.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In a vehicle suspension of the character described and for supporting the frame of the vehicle, the combination comprising a pair of wheels and cranked axles supported by said wheels and extending forwardly therefrom, means differentially connecting the forward ends of the cranks for equalizing up and down motions at their wheel carried ends, and a housing member having a pivot connection to the vehicle frame and swingably connecting the differentially connected ends of said axles to the frame; the improvement which comprises brake mechanisms for the wheels each comprising a brake part rotatable with the wheel and a cooperating brake part mounted upon the axle, bearing means journaling the latter brake part for limited rotation with the wheel connected brake part as a result of brake torque reaction, torque links connected to the journaled brake parts and extending forwardly therefrom and at their forward ends longitudinally slidably connected to the pivot mounting for said housing member, and spring means yieldably resisting longitudinal movements of said torque links due to brake torque reaction.

2. In a vehicle suspension of the character described and for supporting the frame of the vehicle, the combination comprising a pair of wheels and cranked axles supported by said wheels and extending forwardly therefrom, means differentially connecting the forward ends of the cranks for equalizing up and down motions at their wheel carried ends, and a housing member having a pivot connection to the vehicle frame and swingably connecting the differentially connected ends of said axles to the frame; the improvement which comprises brake mechanisms for the wheels each comprising a brake part rotatable with the wheel and a cooperating brake part mounted upon the axle, bearing means journaling the latter brake part for limited rotation with the wheel connected brake part as a result of brake torque reaction, and torque links pivotally connected at rear ends to the said journaled brake parts at points eccentric to the axes of rotation of the wheels and pivotally connected at their forward ends to the forward housing member.

3. In a vehicle suspension of the character described for supporting the frame of the vehicle, the combination comprising a pair of wheels and cranked axles supported by said wheels and extending forwardly therefrom, means pivotally and differentially connecting the forward ends of the cranks for equalizing up and down motions at their wheel carried ends, and a housing member having a pivot connection to the vehicle frame and swingably connecting the differentially connected ends of said axles to the frame; the improvement which comprises brake mechanisms for the wheels each comprising a brake part rotatable with the wheel and a cooperating brake part mounted upon the axle, bearing means journaling the axle mounted brake part for rotation with the other brake part as a result of brake torque reaction, means for restricting such rotation of the axle mounted brake part, and torque arms rigidly extending from the said axle mounted brake parts and connected to the vehicle frame at points remote from the axes of rotation of the wheels but adjacent the pivot of said housing member for transmitting brake torque reaction directly thereto.

4. In a vehicle suspension of the character described for supporting the frame of the vehicle, the combination comprising a pair of wheels and cranked axles supported by said wheels and extending forwardly therefrom, means pivotally differentially mounting the forward ends of the cranks for equalizing up and down motions at their wheel carried ends, and a housing member having a pivot connection to the vehicle frame and swingably connecting the differentially connected ends of said axles to the frame; the improvement which comprises brake mechanisms for the wheels each comprising a brake part rotatable with the wheel and a cooperating brake part mounted upon the axle, bearing means journaling the latter brake part for limited rotation with the wheel connected brake part as a result of brake torque reaction, torque arms rigidly extending from the said journaled brake parts and connected at points remote from the axes of rotation of the wheels to the vehicle frame for transmitting brake torque reaction thereto, the forward ends of said torque arms having elongated slots, and rollers connected to the frame and playing in said slots to permit equalizing movements of the wheels while causing the brake torque reaction to exert a leverage action upon the vehicle frame itself.

5. In a vehicle suspension of the character described for supporting the frame of the vehicle, the combination comprising a pair of wheels and cranked axles supported by said wheels and extending forwardly therefrom, means differentially connecting the forward ends of the cranks for equalizing up and down motions at their wheel carried ends, and a housing member having a pivot connection to the vehicle frame and swingably connecting the differentially connected ends of said axles to the frame; the improvement which comprises brake mechanisms for the wheels each comprising a brake part rotatable with the wheel and a cooperating brake part mounted upon the axle, bearing means journaling the latter brake part for limited rotation with the wheel connected brake part as a result of brake torque reaction, torque arms extending radially from the axes of rotation of the wheels and connected to said journaled brake parts, a reversely bent crank element pivotally mounted upon the said housing member and having oppositely extending cranks, and torque links pivotally connected between the said torque arms and said cranks whereby the movement of one of said journaled brake parts responsive to brake torque reaction will be differentially and compensatingly transmitted through the said crank element to the other of said journaled brake parts.

6. In a vehicle suspension of the character described and for supporting the frame of the vehicle, the combination comprising a pair of wheels and cranked axles supported by said wheels and extending forwardly therefrom, means differentially connecting the forward ends of the cranks for equalizing up and down motions at their wheel carried ends and a member pivotally connected to the frame and connected to said axles; the improvement which comprises brake mechanisms for the wheels each comprising a brake part rotatable with the wheel and a cooperating brake part mounted upon the axle, bearing means journaling the latter brake part for limited rotation with the wheel connected brake part as a result of brake torque reaction, and means operative in response to said movement of the journaled brake parts for applying a braking force resisting differential movements of the said cranked axles.

7. In a vehicle suspension of the character described and for supporting the frame of the vehicle, the combination comprising a pair of wheels and cranked axles supported by said wheels and extending forwardly therefrom and connected to the frame, and means differentially connecting the forward ends of the cranks for equalizing up and down motions at their wheel carried ends and a member connecting the axles to the frame; the improvement which comprises brake mechanisms for the wheels each comprising a brake part rotatable with the wheel and a cooperating brake part mounted upon the axle, bearing means journaling the latter brake part for limited rotation with the wheel connected brake part as a result of brake torque reaction, studs carried by the said journaled brake parts, brake rods slidably associated with the cranked axles having looped ends engageable by said studs to longitudinally move the brake rods in response to motion of the brake parts by brake torque reaction, and brake shoes carried by the said brake rods for frictionally engaging a brake surface adjacent the differentially connected ends of the cranked axles to resist motion thereof as a result of brake torque reaction.

8. In a vehicle suspension of the character described for supporting the frame of a vehicle, the combination comprising a pair of wheels and cranked axles connected to the frame and at rear ends supported by said wheels, means differentially connecting the forward ends of the cranks for equalizing up and down motions at their wheel carried ends and a member connecting the axles to the frame; the improvement which comprises brake mechanisms for the wheels each comprising a brake part rotatable with the wheel and a cooperating brake part mounted upon the axle, bearing means journaling the latter brake part for limited rotation with the wheel connected brake part as a result of brake torque reaction, studs carried by the said journaled brake parts, brake rods slidably associated with the cranked axles having end loops engageable by said studs to longitudinally move the brake rods in response to motion of the brake parts by brake torque reaction, brake shoes carried by the said brake rods for frictionally engaging a brake surface adjacent the differentially connected ends of the cranked axles to resist motion thereof as a result of brake torque reaction, and the said end loops of the brake rods having opposed open and closed ends whereby motion of the journaled brake parts in either direction will be transmitted through the brake rods to the brake shoes.

9. In a vehicle suspension of the character described for supporting the frame of a vehicle, the combination comprising a pair of wheels and cranked axles supported by said wheels and extending forwardly therefrom and a member connecting the axles to the frame, means differentially connecting the forward ends of the cranks for equalizing up and down motions at their wheel carried ends; the improvement which comprises brake mechanisms for the wheels each comprising a brake part rotatable with the wheel and a cooperating brake part mounted upon the axle, bearing means journaling the latter brake part for limited rotation with the wheel connected brake part as a result of brake torque reaction, and a torque bar of spring material secured at one end to each of said journaled brake parts for swingable movement thereby at its other end, and means connecting these other ends of the torque bars to the vehicle whereby brake torque reaction will flex the bars and transmit the reactive forces to the vehicle at points remote from the axes of rotation of the wheels.

10. In a vehicle suspension of the character described for supporting the frame of a vehicle, the combination comprising a pair of wheels and cranked axles supported by said wheels and extending forwardly therefrom and connected to the frame, means differentially connecting the forward ends of the cranks for equalizing up and down motions at their wheel carried ends and a member connecting the axles to the frame; the improvement which comprises brake mechanisms for the wheels each comprising a brake part rotatable with the wheel and a cooperating brake part mounted upon the axle, bearing means journaling the latter brake part for limited rotation with the wheel connected brake part as a result of brake torque reaction, torque rods connected to each of said journaled brake parts at opposite points spaced from the axes of rotation of the associated wheel and extending to points remote from said wheel, means slidably connecting these ends of the rods to the vehicle, and springs resisting movement of each rod in one direction as a result of brake torque reaction whereby reactive forces will be transmitted through the rods to the vehicle with the rods under tension and to points remote from the axes of rotation of the wheels.

11. In a vehicle suspension of the character described and for supporting the frame of the vehicle, the combination comprising a pair of wheels and cranked axles supported by said wheels and extending forwardly therefrom, means differentially connecting the forward ends of the cranks for equalizing up and down motions at their wheel carried ends, and a member having a forward pivot connection to the frame and swingably connecting the differentially connected ends of the said axles to the frame; the improvement which comprises means for removing the effects of brake torque reaction from the differential connecting means and transmitting the effects of such reaction to a point remote from said means and which includes a brake part capable of limited movement with each wheel as the same is braked, and means connecting said part to the frame.

12. A wheel suspension for a vehicle frame, comprising in combination, a pair of close spaced and brake equipped wheels, cranked axles having journals at their rear ends for the respective wheels, differential mechanism swingably connecting the forward ends of the axles for differential up and down movements at their rear ends, means supportably connecting the axles to the frame, and mechanism operative to remove the effects of brake torque reaction from the differential mechanism and transmit the same to the frame.

13. A wheel suspension for a vehicle frame, comprising in combination, a pair of close spaced and brake equipped wheels, cranked axles having journals at their rear ends for the respective wheels, differential mechanism swingably connecting the forward ends of the axles for differential up and down movements at their rear ends, means supportably connecting the axles to the frame, mechanism including brake parts operative for limited rotation with the wheels as a result of braking torque, and means connecting said brake parts to the frame to transmit brake torque reaction thereto and by-passing the differential mechanism.

14. A wheel suspension for a vehicle frame, comprising in combination, a pair of close spaced and brake equipped wheels, cranked axles having journals at their rear ends for the respective wheels, differential mechanism swingably connecting the forward ends of the axles for differential up and down movements at their rear ends, a member connected to the axles and extending forwardly therefrom, pivot means connecting said member at its forward end to the frame for upward and downward swinging movements with respect thereto about a pivot axis, mechanism including a brake part of each wheel capable of limited rotation with the wheel as a result of brake torque reaction, and means connecting each of said brake parts to said member to transmit the brake torque reaction from each wheel directly thereto.

15. A wheel suspension for a vehicle frame, comprising in combination, a pair of close spaced and brake equipped wheels, cranked axles having journals at their rear ends for the respective wheels, differential mechanism swingably connecting the forward ends of the axles for differential up and down movements at their rear ends, a member connected to the axles and extending forwardly therefrom, pivot means connecting said member at its forward end to the frame for upward and downward swinging movements with respect thereto about a pivot axis, mechanism including a brake part of each wheel capable of limited rotation with the wheel as a result of brake torque reaction, and means connecting each of said brake parts to said member adjacent the pivot axis thereof for transmitting the brake torque reaction thereto.

16. A wheel suspension for a vehicle frame, comprising in combination, a pair of close spaced and brake equipped wheels, cranked axles having journals at their rear ends for the respective wheels, differential mechanism swingably connecting the forward ends of the axles for differential up and down movements at their rear ends, a member connected to the axles and extending forwardly therefrom, pivot means connecting said member at its forward end to the frame for upward and downward swinging movements with respect thereto about a pivot axis, mechanism including a brake part of each wheel capable of limited rotation with the wheel as a result of brake torque reaction, and means connecting each of said brake parts to said member at the pivot axes thereof and transmitting brake torque reaction through said pivot means of the frame.

References Cited in the file of this patent

UNITED STATES PATENTS

| | | |
|---|---|---|
| 824,215 | Snyder | June 26, 1906 |
| 1,238,105 | Church | Aug. 28, 1917 |
| 1,944,144 | Fortini | Jan. 16, 1934 |
| 2,078,210 | Sanford | Apr. 20, 1937 |
| 2,254,451 | Ronning | Sept. 2, 1941 |
| 2,284,484 | Eksergian | May 26, 1942 |
| 2,286,576 | Ronning | June 16, 1942 |
| 2,434,055 | Sauer | Jan. 6, 1948 |
| 2,520,777 | Page | Aug. 29, 1950 |